US010671391B2

(12) United States Patent
Sudhakar et al.

(10) Patent No.: US 10,671,391 B2
(45) Date of Patent: Jun. 2, 2020

(54) MODELESS INSTRUCTION EXECUTION WITH 64/32-BIT ADDRESSING

(71) Applicant: MIPS Tech, LLC, Santa Clara, CA (US)

(72) Inventors: Ranganathan Sudhakar, Santa Clara, CA (US); Ranjit J Rozario, San Jose, CA (US)

(73) Assignee: MIPS Tech, LLC, Santa Clara, CA (US)

( * ) Notice: Subject to any disclaimer, the term of this patent is extended or adjusted under 35 U.S.C. 154(b) by 224 days.

(21) Appl. No.: 14/612,090

(22) Filed: Feb. 2, 2015

(65) Prior Publication Data

US 2015/0242212 A1    Aug. 27, 2015

Related U.S. Application Data

(60) Provisional application No. 61/944,334, filed on Feb. 25, 2014.

(51) Int. Cl.
*G06F 9/30* (2018.01)
*G06F 9/34* (2018.01)

(52) U.S. Cl.
CPC ...... *G06F 9/30112* (2013.01); *G06F 9/30192* (2013.01); *G06F 9/342* (2013.01)

(58) Field of Classification Search
CPC ............... G06F 9/30105; G06F 9/3001; G06F 9/30043; G06F 9/30112; G06F 9/30149;

(Continued)

(56) References Cited

U.S. PATENT DOCUMENTS 3,815,101 A  * 6/1974 Boss ................. G06F 9/463
                                       711/220
5,129,068 A  * 7/1992 Watanabe ........... G06F 9/30149
                                       711/214

(Continued)

FOREIGN PATENT DOCUMENTS

EP          0492971 A2    7/1992

OTHER PUBLICATIONS

Patterson, David A., and John L. Hennessy. Computer Organization and Design: The Hardware/software Interface. 3rd ed. Burlington, MA: Morgan Kaufmann, n. d. Print. 2005 (Pertient Pages, 52,58,63,109,136-139,286,294,326).*

(Continued)

*Primary Examiner* — Eric Coleman
(74) *Attorney, Agent, or Firm* — Adams Intellex, PLC (57) ABSTRACT

In an aspect, a processor supports modeless execution of 64 bit and 32 bit instructions. A Load/Store Unit (LSU) decodes an instruction that without explicit opcode data indicating whether the instruction is to operate in a 32 or 64 bit memory address space. LSU treats the instruction either as a 32 or 64 bit instruction in dependence on values in an upper 32 bits of one or more 64 bit operands supplied to create an effective address in memory. In an example, a 4 GB space addressed by 32-bit memory space is divided between upper and lower portions of a 64-bit address space, such that a 32-bit instruction is differentiated from a 64-bit instruction in dependence on whether an upper 32 bits of one or more operands is either all binary 1 or all binary 0. Such a processor may support decoding of different arithmetic instructions for 32-bit and 64-bit operations.

23 Claims, 7 Drawing Sheets

(58) Field of Classification Search
CPC ... G06F 9/26; G06F 9/28; G06F 9/265; G06F 9/34; G06F 9/342; G06F 9/35; G06F 9/355; G06F 12/06; G06F 12/0615; G06F 3/06

See application file for complete search history.

(56) References Cited

U.S. PATENT DOCUMENTS

| | | | | |
|---|---|---|---|---|
| 5,960,465 | A * | 9/1999 | Adams | G06F 12/0292 710/68 |
| 6,457,115 | B1 * | 9/2002 | McGrath | G06F 9/30036 711/220 |
| 6,560,694 | B1 * | 5/2003 | McGrath | G06F 9/30185 711/208 |
| 8,914,619 | B2 * | 12/2014 | Greiner | G06F 9/30145 712/220 |
| 2002/0174319 | A1 | 11/2002 | Rivers et al. | |
| 2003/0225998 | A1 * | 12/2003 | Khan | G06F 9/3001 712/210 |
| 2006/0066460 | A1 * | 3/2006 | Suzuki | G06F 7/02 341/50 |
| 2006/0265572 | A1 * | 11/2006 | Stempel | G06F 9/30149 712/206 |
| 2007/0033381 | A1 * | 2/2007 | Wilson | G06F 9/30014 712/21 |
| 2011/0231633 | A1 * | 9/2011 | Grisenthwaite | G06F 9/3001 712/208 |
| 2011/0314260 | A1 * | 12/2011 | Greiner | G06F 9/30145 712/205 |
| 2012/0151189 | A1 * | 6/2012 | Kruecken | G06F 9/30105 712/220 |
| 2012/0173853 | A1 * | 7/2012 | Ukai | G06F 9/30141 712/220 |
| 2013/0024631 | A1 * | 1/2013 | Balasubramanian | G06F 21/566 711/154 |

OTHER PUBLICATIONS

Patterson, David A., and John L. Hennessy. Computer Organization and Design: The Hardware/software Interface. 3rd ed. Burlington, MA: Morgan Kaufmann, n. d. Print. 2005 (Pertient Pages, 52,58-60,63, 87, 100-105, 109,136-139,286,294,326, 444, 449).*

* cited by examiner

MODELESS INSTRUCTION EXECUTION WITH 64/32-BIT ADDRESSING

CROSS REFERENCE TO RELATED APPLICATIONS

This application claims priority from U.S. Provisional Application No. 61/944,334, entitled "MODELESS INSTRUCTION EXECUTION WITH 64/32-BIT ADDRESSING" and filed on Feb. 25, 2014, and which is incorporated herein in its entirety for all purposes.

BACKGROUND

Field

In one aspect, the following relates to microprocessor architecture, and in a more particular aspect, to implementations of disclosed features.

Related Art

An architecture of a microprocessor pertains to a set of instructions that can be handled by the microprocessor, and what these instructions cause the microprocessor to do. Architectures of microprocessors can be categorized according to a variety of characteristics. One major characteristic is whether the instruction set is considered "complex" or of "reduced complexity". Traditionally, the terms Complex Instruction Set Computer (CISC) and Reduced Instruction Set Computer (RISC) respectively were used to refer to such architectures. Now, many modern processor architectures have characteristics that were traditionally associated with only CISC or RISC architectures. In practicality, a major distinction of meaning between RISC and CISC architecture is whether arithmetic instructions perform memory operations.

Processor architectures can be characterized according to a variety of parameters. One parameter is a number of bits used to address memory, a number of bits available in general purpose registers, and/or a number of bits used to represent instructions. Some architectures may not use the same number of bits for all of these purposes. For example, some processors may use a different number of bits for representing instructions than for a number of bits used to address memory, or a memory word size. In general, however, a number of bits used for all these purposes has increased throughout the years on current-generation processors (even though a wide range of processor architectures continues to exist.) For example, some processor architectures originally had 4 or 8 bit memory word sizes, and have gradually increased to 16-bit, 32-bit, and now 64-bit addressing. A transition from 32-bit to 64-bit has been comparatively recent on a variety of different architectures.

SUMMARY

A question arises as to how a given family of processor architectures that transitioned from 32-bit only to supporting 64-bit addressing will or will not continue to provide support for binaries written for the 32-bit architecture. If it is desired that the 64-bit architecture continue to support existing 32-bit binaries, a suitable implementation of such 64-bit architecture must be realized.

An aspect of the disclosure relates to a computing system that comprises a memory, and a processor. The processor comprises a set of general purpose registers, being at least double-word size (word size and double word size being relative measures). The processor is configurable to execute instructions in a privileged mode and an unprivileged mode, which is controlled by a setting, which is itself maintained by a privileged resource, such as an OS kernel, or a hypervisor. The processor is capable of executing instructions in the unprivileged mode; for example, user code can be executed in unprivileged mode. The instructions comprise both arithmetic instructions and load/store instructions that load data from and store data to the memory. Some implementations may provide for indirect addressing, in which a value stored in a general purpose register can be used as an immediate value in order to calculate a target address for the load or store. Loads can be of instructions or data (and hence address calculations can be performed by one or more of a fetch unit and a load/store unit).

The load/store instructions do not differentiate between single-word and double-word values, which means that data defining the load/store instructions does not itself indicate that a value stored in a register is to be used as a single word or a double word sized immediate value. However, the processor is capable of executing load/store instructions that use general purpose registers as either single-word sized immediate values or as double-word sized immediate values, without executing privileged code at boundaries between single word code and double word code, in order to change an execution mode bit.

An aspect of the disclosure relates to processor for executing machine executable code having different memory addressability ranges. The processor comprises a plurality of registers, each being of a register size. The processor has an instruction decoding unit configured to decode an instruction that accesses memory to obtain a register identifier. The instruction uses one of a smaller address range and a larger address range, and the larger address range is addressable using a number of bits equal to the register size. The processor also has a load store unit configured to receive a value from the register identified by the register identifier and to determine whether the value is within either of two pre-determined ranges of values addressable using a part of the bits of the value from the register, and to calculate an effective address of a memory transaction in dependence on an outcome of the determination.

An aspect of the disclosure relates to a method of machine readable code execution in a processor. The method provides for processing arithmetic instructions by decoding each arithmetic instruction to identify one or more registers identified in that instruction. In an example, the registers are from a set of registers that physically have a double-word size. The method includes determining whether the instruction specifies that the value in each of the one or more registers is to be interpreted as a single-word-sized value or a double-word-sized value. The method includes processing load/store instructions by decoding each load/store instruction to identify one or more registers, from a set of registers, identified in that load/store instruction. The method also provides for evaluating the respective data stored in each of the one or more registers to determine whether a single-word-sized portion of that register is to be used in calculating an effective address for that load/store instruction and calling a code module that uses single-word sized values for arithmetic instructions and for load/store instructions, without first executing privileged code to change an operating mode of the processor.

DETAILED DESCRIPTION

The following disclosure uses examples principally pertaining to a RISC instruction set, and more particularly, to aspects of a MIPS processor architecture. Using such examples does not restrict the applicability of the disclosure to other processor architectures, and implementations thereof.

Currently, the family of MIPS processor architecture includes a 64-bit memory addressability architecture. MIPS 64-bit architectures can execute MIPS 32-bit binaries. However, implementations of MIPS 64-bit architecture require a mode bit to be set in a status register that indicates whether each instruction is to be processed according to a MIPS 32-bit architecture or according to the MIPS 64-bit architecture. Applicants have recognized that it is desirable to avoid having a mode bit for this purpose. One way to avoid having such a mode bit would be to provide entirely new instructions for all 64-bit memory access instructions, including loads, stores, and instructions that may modify the program counter. Applicants have realized however that providing separate 64-bit and 32-bit versions of each instruction uses a great deal of operation code space within an available code space. For example, in MIPS architecture, all instructions are 32-bits, and only 6 bits are allocated to op code. Although there are additional bits available to specify a function, in some addressing modes in MIPS, some instructions affected by memory addressability do not have any allocation of bits for function specification. Also, it is problematic from a programmer's perspective, as well as from development environment creation and maintenance to provide different instructions between 32-bit and 64-bit architecture machines. As such, Applicants have found that another solution to supporting 32-bit code in a 64-bit machine is desired.

Figures 1A, 1B:
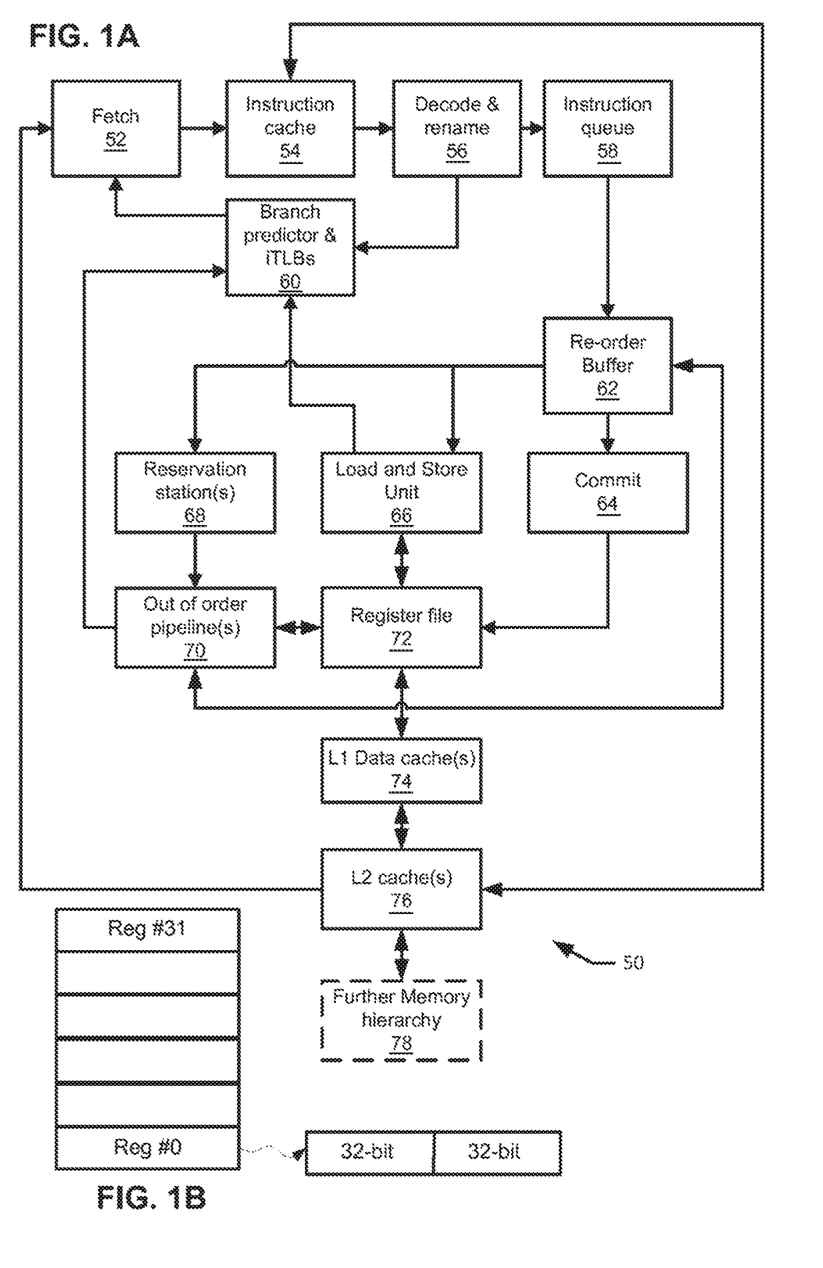
FIGS. 1A and 1B depicts block diagrams pertaining to an example processor which can implement aspects of the disclosure.

FIG. 1A depicts an example diagram of functional elements of a processor 50 that supports 64-bit memory addressing according to aspects of the disclosure. The example elements of processor 50 will be introduced first, and then addressed in more detail, as appropriate. This example is of a processor that is capable of out of order execution; however, disclosed aspects can be used in an in-order processor implementation. As such, FIG. 1A depicts functional elements of a microarchitectural implementation of the disclosure, but other implementations are possible. Also, different processor architectures can implement aspects of the disclosure. The names given to some of the functional elements depicted in FIG. 1A may be different among existing processor architectures, but those of ordinary skill would understand from this disclosure how to implement the disclosure on different processor architectures, including those architectures based on pre-existing architectures and even on a completely new architecture.

Processor 50 includes a fetch unit 52, which is coupled with an instruction cache 54. Instruction cache 54 is coupled with a decode and rename unit 56. Decode and rename unit 56 is coupled with an instruction queue 58 and also with a branch predictor that includes an instruction Translation Lookaside Buffer (iTLB) 60. Instruction queue 58 is coupled with a ReOrder Buffer (ROB) 62 which is coupled with a commit unit 64. ROB 62 is coupled with reservation station(s) 68 and a Load/Store Unit (LSU) 66. Reservation station(s) 68 are coupled with Out of Order (OO) execution pipeline(s) 70. Execution pipeline(s) 70 and LSB 66 each couple with a register file 72.

Register file 72 couples with an L1 data cache(s) 74. L1 cache(s) 74 couple with L2 cache(s) 76. Processor 50 may also have access to further memory hierarchy elements 78. Fetch unit 52 obtains instructions from a memory (e.g., l2 cache 76, which can be a unified cache for data and instructions). Fetch unit 52 can receive directives from branch predictor 60 as to which instructions should be fetched.

Functional elements of processor 50 depicted in FIG. 1A may be sized and arranged differently in different implementations. For example, instruction fetch 52 may fetch 1, 2, 4, 8 or more instructions at a time. Decode and rename 56 may support different numbers of rename registers and queue 58 may support different maximum numbers of entries among implementations. ROB 62 may support different sizes of instruction windows, while reservation station(s) 68 may be able to hold different numbers of instructions waiting for operands and similarly LSB 66 may be able to support different numbers of outstanding reads and writes. Instruction cache 54 may employ different cache replacement algorithms and may employ multiple algorithms simultaneously, for different parts of the cache 54. Defining the capabilities of different microarchitecture elements involve a variety of tradeoffs beyond the scope of the present disclosure.

Implementations of processor 50 may be single threaded or support multiple threads. Implementations also may have Single Instruction Multiple Data (SIMD) execution units. Execution units may support integer operations, floating point operations or both. Additional functional units can be provided for different purposes. For example, encryption offload engines may be provided. FIG. 1A is provided to give context for aspects of the disclosure that follow and not by way of exclusion of any such additional functional elements. This is a non-exhaustive enumeration of examples of design choices that can be made for a particular implementation of processor 50.

FIG. 1B depicts that register file 72 of processor 50 may include 32 registers. Each of these registers contains 64 bits in an example. Each register may be identified by a binary code associated with that register. In a simple example, 00000b identifies Register 0, 11111b identifies Register 31, and registers in between are numbered accordingly. Processor 50 performs computation according to specific configuration information provided by a stream of instructions. These instructions are in a format specified by the architecture of the processor. An instruction may specify one or more source registers, and one or more destination registers for a given operation. The binary codes for the registers are used within the instructions to identify different registers. The registers that can be identified by instructions can be known as "architectural registers", which present a large portion, but not necessarily all, of the state of the machine available to executing code. Implementations of a particular processor architectural may support a larger number of physical registers. Having a larger number of physical registers allows speculative execution of instructions that refer to the same architectural registers. Register file 72 may have different numbers and kinds of ports in different implementations. For example, some implementations may supply two ports, while others may supply more. Some implementations may have designated read ports and write ports. In an example, the registers have more than 64 bits (e.g., 128 or 256 bits). In some implementations, registers may have more than 64 bits, and by logically divided into multiple logical general purpose registers. For example, a 128 bit register may be divided into two 64-bit logical registers. Therefore, according to some implementations, general purpose registers can be implemented by one or more of physical registers of a given size and logical registers of a given size.

Figure 2:
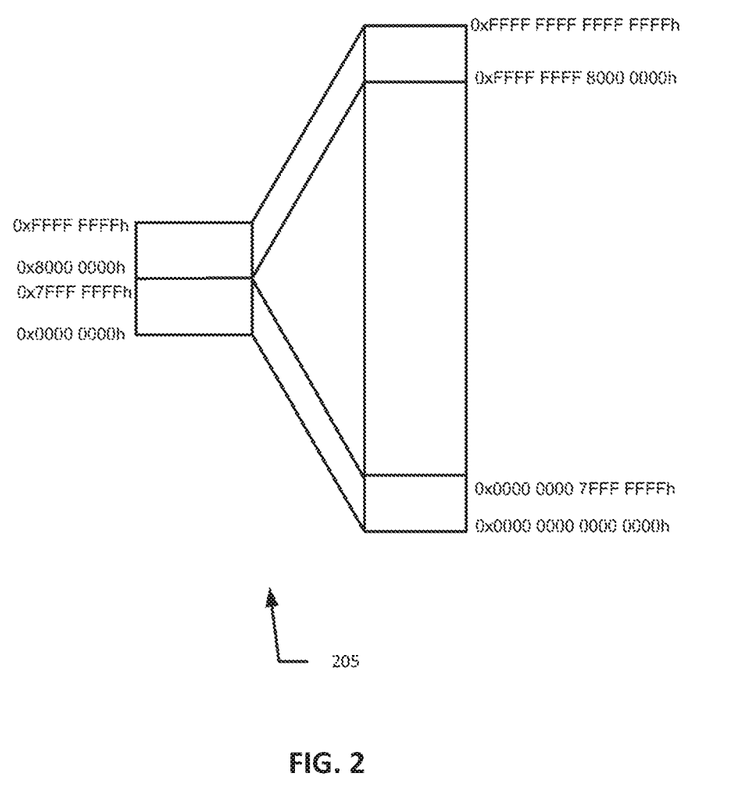
FIG. 2 depicts an example address space mapping for mapping a 32-bit byte addressable space into a 64-bit addressable space.

FIG. 2 depicts an example mapping 205 of a memory space addressable using only 32-bits to a memory space addressable using 64-bits (called a "64-bit memory space" for ease of reference). This example mapping provides that a lower 2 GigaBytes (GB) of address space (under byte addressing, although implementations according to the disclosure are not limited to byte addressing), is mapping to a bottom of the 64-bit memory space and an upper 2 GB of the 32-bit memory space are mapped to a top of the 64-bit memory space. In this disclosure, the upper and lower portions of memory are used in the context of the examples presented, which are generally in accordance with little endian addressing. However, aspects of the disclosure are not limited to little endian architectures, and in fact, MIPS architecture processors may operate in big or little endian modes. Those of ordinary skill would be able to implement these disclosures according to the specific circumstances presented in that implementation.

When the 64-bit processor of FIG. 1A is executing 32-bit code, an upper 32-bits of a 64-bit register is unused for memory access operations. In the context of the mapping depicted in FIG. 2, the upper 32 bits are either all binary zeros, for all memory addresses in the lower 2 GB of memory, or all ones, for all memory addresses in the upper 2 GB of memory. It is essential for a processor to be able to load data from memory and store data to memory.

Load instructions and store instructions are provided for such purposes. One approach to addressing memory for loads and stores is to calculate the memory address and store the memory address in a register, using one instruction, and then refer to that register using a load or store instruction (a register-based addressing mode).

Some load and store instructions provide an indirect addressing mode, in which a memory address to be accessed is determined according to data in a register (a base address) and an immediate (constant) value (an offset) supplied with the load or store instruction itself. For loads or stores using indirect addressing modes, LSU 66 calculates an address using the contents of the register identified in the instruction and the supplied immediate value. However, in the absence of a mode bit indicating whether the register stores a 32-bit or 64-bit quantity, or a different opcode to distinguish 32-bit from 64-bit instructions, LSU 66 cannot properly calculate the address.

In particular, if the instruction were from 32-bit code, then the upper part of the 64-bit register would be sign-extended data. For example, for 32-bit code, when a base address is in the lower 2 GB of space, and adding the immediate to the base address would transition across the 2 GB boundary, the desired 32-bit address is in the upper 2 GB, which is mapped to a top of the 64-bit address space, and not contiguously to the lower 2 GB. Therefore, the appropriate physical address in such a situation would retain the lower 32-bits of the addition, but sign-extend the result, which in this example means that the upper 32 bits would be set to binary 1. However, if the instruction were from 64-bit code, then the appropriate physical address is contiguous with the lower 2 GB, which means that the full 64-bits resulting from the addition such be maintained.

MIPS® 64 supports register-based 32-bit addressing on a 64-bit architecture by supplying separate instructions for 32-bit arithmetic instructions and for 64-bit arithmetic instructions. For example, a 32-bit add performs the sign extension discussed above, while the 64-bit add does not, and in each case stores the result in a destination register that is 64 bits. Then, an instruction can directly use the contents of the destination register without any concern whether the contents represent a sign-extended 32-bit quantity or a 64-bit quantity, because in each case the contents are interpreted the same. This is not the case for indirect addressing.

Figure 3:
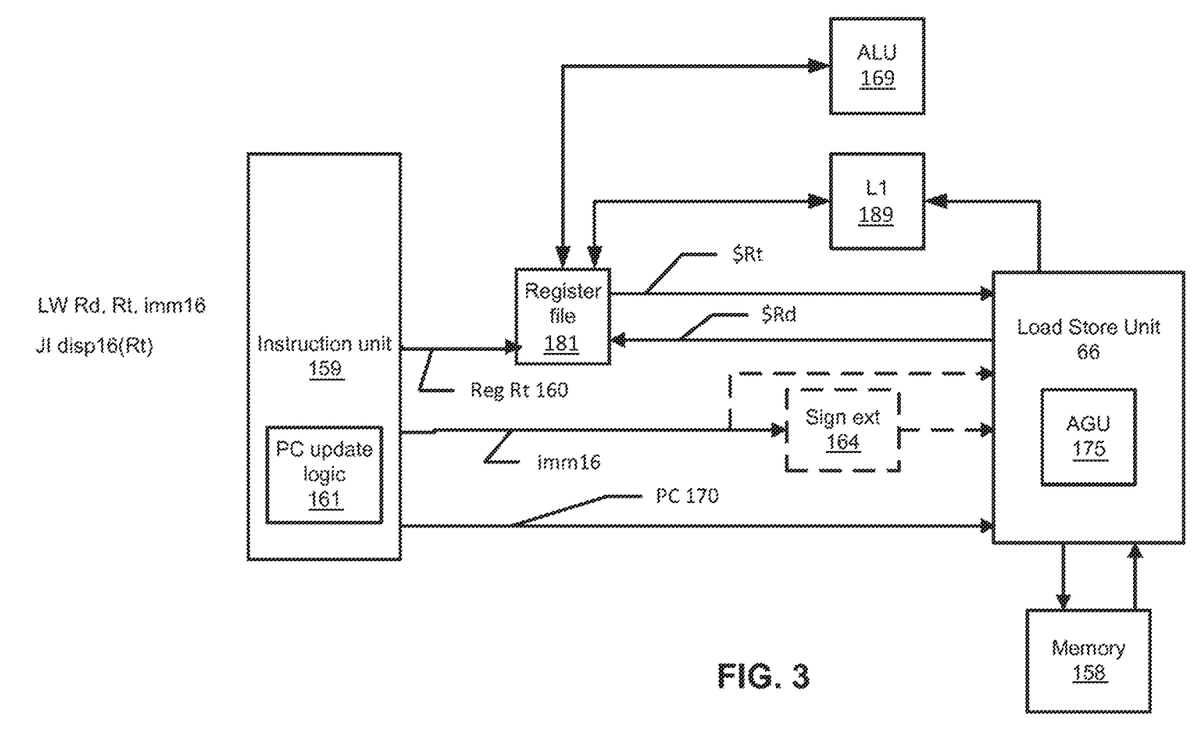
FIG. 3 depicts an example configuration of an implementation of a processor according to the disclosure, in which an Address Generation Unit determines how to interpret operands for a memory access instruction according to aspects of the disclosure.

Focusing on a specific example for clarity, the load word (LW) instruction does not have a different version for 32 and 64 bit code. Turning to FIG. 3, there is depicted further example details of an example processor, in which an instruction unit 159 can decode a LW instruction that specifies a destination register (Rd), a source register (Rt), and an immediate (imm16), Instruction unit 159 includes PC update logic 161. A register file 181 is accessed to retrieve contents of Rt ($Rt), which are provided to LSU 66. An ALU 169 also couples with register file 181, in order to be able to access register contents for arithmetic instructions, but which would not participate in processing the LW instruction currently being addressed. An address generation unit (AGU 175) is located in Load Store Unit 66 and couples with a memory 158. AGU 175 produces an effective address, based on the contents of Rt and the imm16 (which may be sign extended 164), and LSU 66 obtains data from memory 158 stored at that effective address. Details concerning how memory 158 may be implemented are abstracted from the present disclosure, and a wide variety of memory architectures may be supported by different implementations of the disclosure. For example, memory 158 may be implemented as including one or more layers of cache hierarchy, in addition to a main memory. LSU 66 stores contents at the effective address in the register identified by Rd. Some implementations also may always store the retrieved data in an L1 cache 189. Other addressing modes may be supported by LSU 66, which include program counter relative loads. For such purpose, a value of program counter 170 also may be provided to LSU 66. A value of program counter 170 may be processed the same way as contents from register Rt. Different implementations may provide an incremented program counter, and this disclosure is not to be interpreted as requiring any particular approach to calculating an effective address relative to a program counter value.

As such, AGU 175 receives contents of the source register specified by the LW instruction (Rt), as well as the immediate value contained in the LW. AGU 175 then must generate the 64-bit address to be used to address the correct memory location for the LW instruction. However, AGU 175 does not have any a priori knowledge as to whether the LW instruction is from 32-bit or 64-bit code, and there is no explicit indication within the instruction data itself. Currently, a MIPS 64 machine uses a mode bit to determine whether the instruction is operating under a 32-bit mode or a 64-bit mode.

Figure 4:
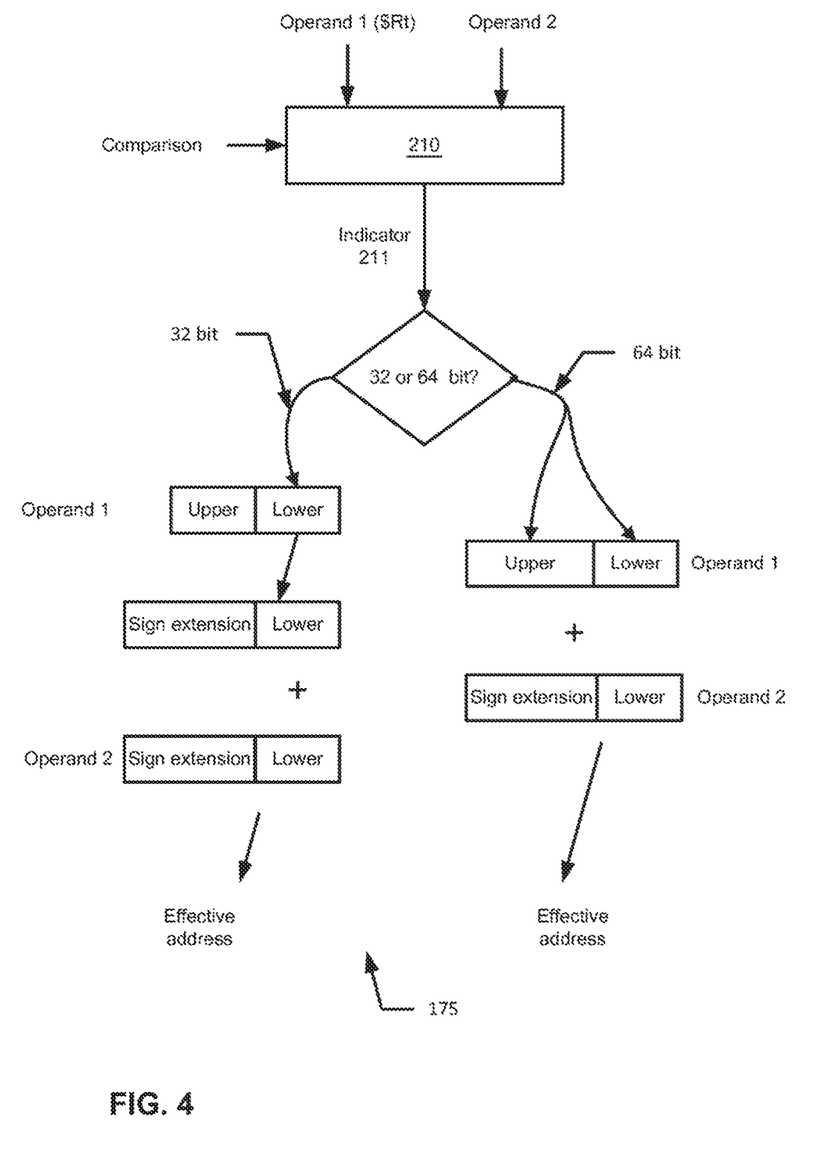
FIG. 4 depicts further details of an example Address Generation Unit according to the disclosure.
Figure 5:
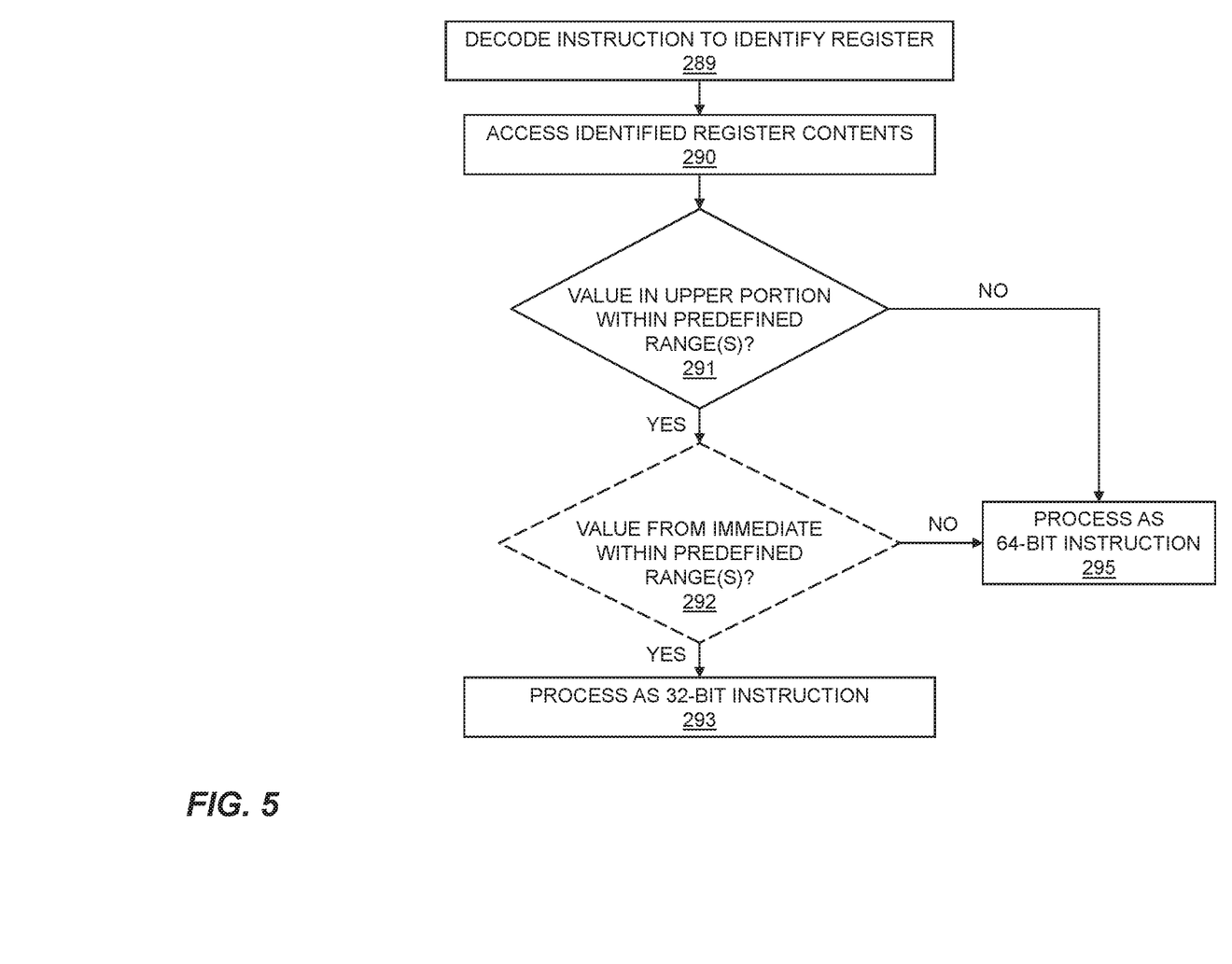
FIG. 5 depicts an example process according to the disclosure.

FIG. 4 presents an example implementation of AGU 175 that can determine the correct address for the LW instruction, regardless whether the LW is from 64 bit or 32 bit code, and without using a mode bit. FIG. 5 depicts an example process that can be implemented by AGU. FIG. 4 depicts that AGU 175 includes comparator circuitry 210 that accepts an operand 1, an operand 2, and a comparison value. In this example, operand 1 is a value from register Rt, which holds a base address for the LW instruction and operand 2 is a 16-bit immediate from the LW instruction. The comparison is a definition of address ranges to be compared with the values in portions of one or more of operand 1 and operand 2. Comparator circuitry 210 outputs an indicator 211 that indicates whether the instruction should be interpreted as a 64 bit or a 32 bit instruction. If a 32-bit instruction, then AGU 175 adds a lower portion of the value of operand 1 to a sign-extended operand 2 to produce an effective memory address. If the instruction is to be interpreted as a 64-bit instruction, then both the upper and lower portions of operand 1 are used a single value, and a sign-extended version of operand 2 is added to the value of operand 1. Concerning operand 2, this example is of a 16-bit immediate. However, operand 2 can be any of a variety of sizes. In some implementations, if immediate values are never outside of pre-determined ranges, then an explicit check for these values may be dispensed with. Comparator circuitry 210 can be implemented as a digital comparator between an upper 32 bits of Rt and each of the values 0 and 0xFFFF FFFFh.

The condition that a defined set of bits are either all one or all zero is referred to as "canonical" herein. If all arguments have canonical upper 32-bit portions then the instruction is executed as a 32-bit instruction. If any of the arguments do not have canonical upper 32-bit portions, then the instruction is executed as a 64-bit instruction. As an example, consider a "load byte" instruction that references a base address of 0x0000 0000 7FFF FFFEh, and includes an immediate value of 4 (base 10). The base address has an upper 32 bits that are canonical and is within the lower 2 GB portion. Similarly, decimal 2 is represented by 0x0000 0000 0000 0010h in a 64 bit register, such that this value also is canonical in the upper 32 bits. Thus, the load byte is treated as a 32-bit instruction, and the addition is performed by sign extending the result of the addition across the full register width, resulting in a final value of 0xFFFF FFFF 0000 0002h. By contrast, if the base address in the load byte instruction were 0x0000 0001 0000 0001h, then this address is not canonical in the upper 32 bits, and hence the load byte would not be interpreted as a 32-bit instruction but rather as a 64-bit instruction, resulting in an effective address of 0x0000 0001 0000 0101h.

Instruction fetch address calculation logic (e.g., PC update logic 161 of FIG. 3) also may implement these address calculation aspects. For example, when a program counter needs to be updated to fetch a next instruction, or when a branch or jump target address needs to be calculated, the instruction fetch address calculation logic performs similar operations. By particular example, if a program counter is at an upper boundary of the lower 2 GB segment, then incrementing by 4 (32 bit instructions, byte addressability) is performed to obtain the next instruction. However, to observe the address mapping of FIG. 2, this increment actually needs to be mapped to the beginning of the upper 2 GB. In terms of hex addresses, if the program counter is at 0x0000 0000 7FFF FFFFh, an increment by 4 for a 32-bit program should result in effective address that begins at 0xFFFF FFFF 0000 0003h, and not 0x0000 0001 0000 0003h. The converse calculation also can be demonstrated, in that if the base address were 0xFFFF FFFF 0000 0003h, and the offset was −4 (subtracting 4 from the base address), then both of these values are canonical in their upper 32 bits (either all ones or all zeros). Thus, the address is calculated as a 32 bit value, which means that the subtraction is calculated to be 0x0000 0000 7FFF FFFFh.

In some examples, these address calculation disclosures can be implemented for each address generation situation in which there is not a separate instruction for 32-bit versus 64-bit usage situations. These situations may arise in calculating effective addresses for loads and stores of data, as well as in incrementing a program counter, or determining a jump or branch target address. Therefore, a processor may be designed to implement arithmetic instructions that specify whether they are for 32 bit or 64 bit operands, while instructions that operate on memory may not specify whether operands are to be treated as 32 bit or 64 bit numbers. The combination of these approaches thus may allow dispensing with a mode bit or other condition code that indicates whether a given instruction is to be interpreted as a 64 bit or a 32 bit instruction. Rather, either that information comes from an instruction itself, and thus can be propagated from the instruction decoder, or else can be inferred from values of the operands themselves.

The examples herein primary focus on 64 bit operands and 32-bit operands. However, this is for clarity. More generally, aspects of the disclosure apply to any processor implementation in which a sub-portion of a register of a given physical size is to be used for effective address calculation, for example. Such portions can be the same proportion, or different, e.g., a processor with a 64-bit physical register could provide for different address modes for 32-bit and 16-bit code (e.g., double or quad word addressing), or a processor with a 128-bit register could also function as such. Although 2:1 ratios are expected to be most common, that also is not a requirement.

FIG. 5 depicts an example process according to the disclosure. At 289, an instruction is decoded to identify a register. At 290, contents of the register are accessed. At 291, it is determined whether a value in a portion (e.g., an upper portion) of the register contents is within any of one or more pre-defined ranges. If not, then the instruction is processed as a 64-bit instruction 295, Optionally, at 292, it can be determined whether another operand (e.g., an immediate) also is within one or more pre-defined ranges. If so, then at 293, the instruction is processed as a 32-bit instruction. If 292 is not implemented, then 293 may be implemented directly after 291.

It would be appreciated that a variety of logical equivalences can be used to express the operation of implementations of the disclosure. For example, rather than determining whether register contents are within a given range or ranges, it also can be determined whether or not the value is not within those range(s). Also, a variety of addressing modes and sources of operands may be provided, and the example of decoding an instruction to identify a register that sources a value is one example.

Figure 6:
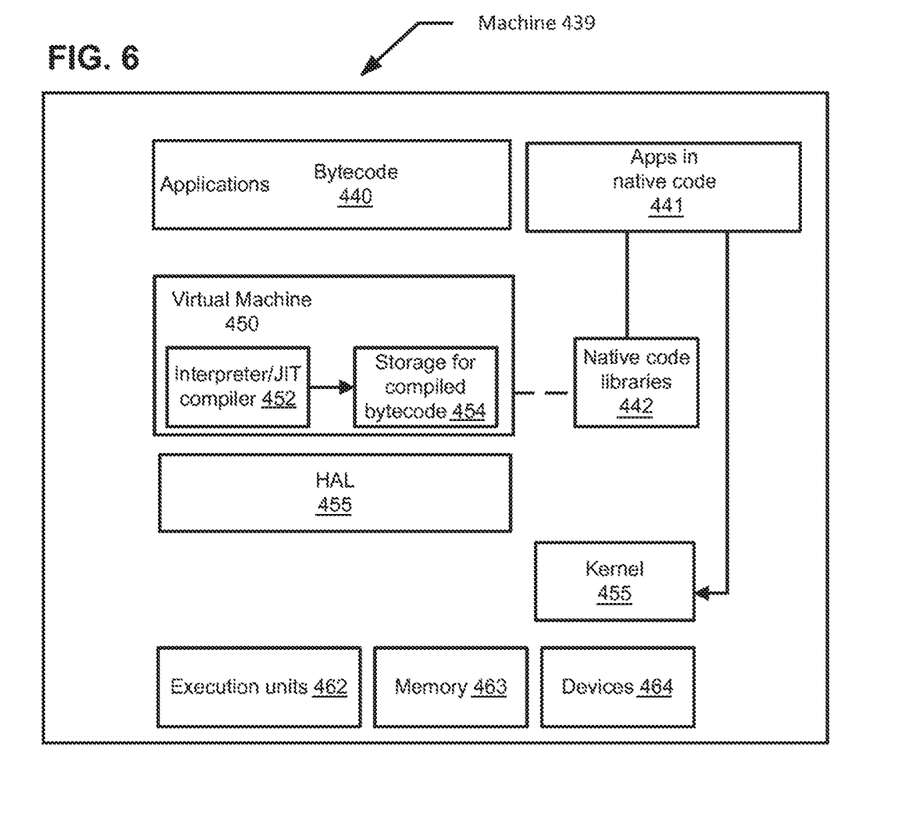
FIG. 6 depicts example functional elements of a machine implementing the disclosure.

FIG. 6 depicts a block diagram of an example machine 439 in which aspects of the disclosure may be employed. A set of applications are available to be executed on machine 439. These applications are encoded in bytecode 440. Applications also can be represented in native machine code; these applications are represented by applications 441.

Applications encoded in bytecode are executed within virtual machine 450. Virtual machine 450 can include an interpreter and/or a Just In Time (JIT) compiler 452. Virtual machine 450 may maintain a store 454 of compiled bytecode, which can be reused for application execution. Virtual machine 450 may use libraries from native code libraries 442. These libraries are object code libraries that are compiled for physical execution units 462. A Hardware Abstraction Layer 455 provides abstracted interfaces to various different hardware elements, collectively identified as devices 464. HAL 455 can be executed in user mode. Machine 439 also executes an operating system kernel 455. In implementations of the disclosure, code libraries 442 can be 32-bit and/or 64-bit libraries. Calls may be made from 64-bit code into 32-bit code libraries without trapping through an operating system or other privileged code to update a mode bit. Where an implementation conforms to a processor architecture that provides different 64 bit and 32 bit arithmetic instructions, and the 64 bit instructions are a superset of the 32-bit instructions, it may also be the case that the 32 bit libraries do not need to be recompiled, since the processor would be able to process those instructions as a subset of the instruction set architecture supported.

Devices 464 may include IO devices and sensors, which are to be made available for use by applications. For example, HAL 455 may provide an interface for a Global Positioning System, a compass, a gyroscope, an accelerometer, temperature sensors, network, short range communication resources, such as Bluetooth or Near Field Communication, an RFID subsystem, a camera, and so on.

Machine 439 has a memory 463 and a set of execution units 462 which consume machine code which configures the execution units 462 to perform computation. Such machine code thus executes in order to execute applications originating as bytecode, as native code libraries, as object code from user applications, and code for kernel 455. Any of these different components of machine 439 can be implemented using the virtualized instruction encoding disclosures herein.

Implementations of the disclosure may be used to implement execution of intermingled 32-bit and 64-bit user-mode code, without executing privileged mode code to change an execution mode. For example, a processor according to the disclosure has registers that are double-word sized registers. The processor may be capable of decoding an arithmetic instruction that explicitly indicates whether register(s) identified by that instruction are to be interpreted as single-word sized values or double-word sized values. However, an instruction set capable of being decoded by the processor may not have different instructions for single word and for double word memory access operations. In such circumstances, the processor uses a value in one or more of the registers identified in each instruction to determine an effective address for that instruction. Such a processor, in one implementation, does not provide a mode bit indicating whether a given instruction is to be interpreted as using single word or double word sized operand values. Such a processor may be executing code that uses double-word sized operands, and which calls into a library of that uses single-word sized operands, and does not require updating a mode bit in conjunction with such a library call. Such a processor may avoid a substantial delay and execution of additional instructions required to trap to a privileged mode code section (e.g., in a hypervisor or operating system) to change an operating mode of the processor.

Figure 7:
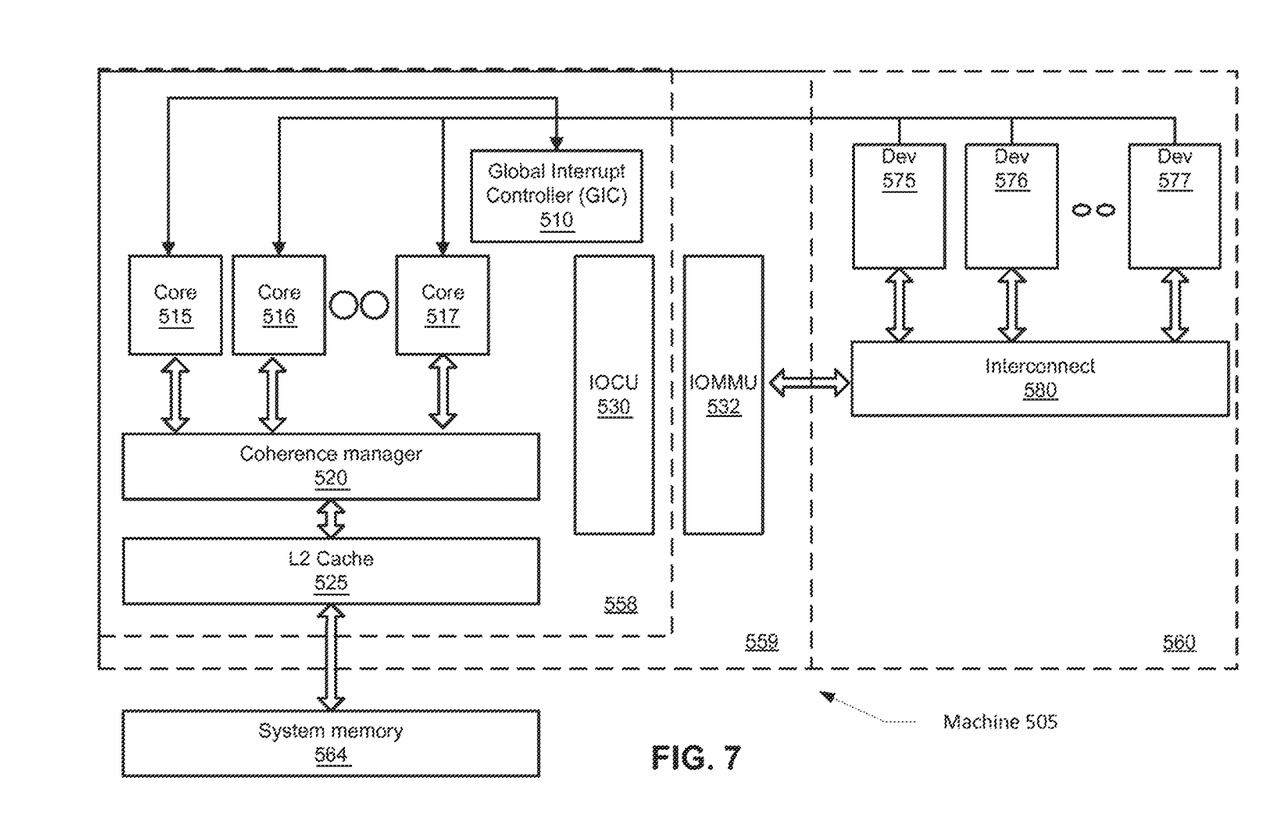
FIG. 7 depicts an example machine in which aspects of the disclosure may be implemented.

FIG. 7 depicts an example of a machine 505 that implements execution elements and other aspects disclosed herein. FIG. 7 depicts that different implementations of machine 505 can have different levels of integration. In one example, a single semiconductor element can implement a processor module 558, which includes cores 515-517, a coherence manager 520 that interfaces cores 515-517 with an L2 cache 525, an I/O controller unit 530 and an interrupt controller 510. A system memory 564 interfaces with L2 cache 525. Coherence manager 520 can include a memory management unit and operates to manage data coherency among data that is being operated on by cores 515-517. Cores may also have access to L1 caches that are not separately depicted. In another implementation, an IO Memory Management Unit (IOMMU) 532 is provided. IOMMU 532 may be provided on the same semiconductor element as the processor module 558, denoted as module 559. Module 559 also may interface with 10 devices 575-577 through an interconnect 580. A collection of processor module 558, which is included in module 559, interconnect 580, and 10 devices 575-577 (which may be included in module 560) can be formed on one or more semiconductor elements. In the example machine 505 of FIG. 7, cores 515-517 may each support one or more threads of computation, and may be architected according to the disclosures herein.

In various parts of the disclosure, determining values relative to a program counter was disclosed. For example, some disclosed aspects relate to adding a quantity to a program counter value, or otherwise determining a target branch address. It would be understood that these disclosures include adding a quantity to another quantity determined from the program counter value (e.g., the program counter value incremented by a value indicative of an instruction size, such as 4, in a situation where instructions are 32 bits and memory is byte-addressable). As such, these disclosures are not to be interpreted to exclude implementations in which certain details may be varied according to specifics of the processor architecture or microarchitecture.

Also, these address calculations can be made for any self-consistent environment; Addresses of instructions generated for 32-bit and for 64-bit code may both appear to be physical addresses, but can still be mapped or translated by a memory management unit to other addresses. Therefore, the disclosure does not imply a requirement that addresses in memory that are depicted as being contiguous are in fact physically contiguous in actual memory.

Also, the example showed a situation where a 32-bit address space was mapped in two parts to portions of a 64-bit address space. However, the disclosures can be applied to situations where a 32-bit address space is mapped to more than two portions of a 64-bit address space. Also, the mapped portions do not necessarily need to be as depicted in FIG. 2, although such variations would present complications in terms of complexity of logic required to implement the disclosed aspects.

Modern general purpose processors regularly require in excess of two billion transistors to be implemented, while graphics processing units may have in excess of five billion transistors. Such transistor counts are likely to increase. Such processors have used these transistors to implement increasing complex operation reordering, prediction, more parallelism, larger memories (including more and bigger caches) and so on. As such, it becomes necessary to be able to describe or discuss technical subject matter concerning such processors, whether general purpose or application specific, at a level of detail appropriate to the technology being addressed. In general, a hierarchy of concepts is applied to allow those of ordinary skill to focus on details of the matter being addressed.

For example, high level features, such as what instructions a processor supports conveys architectural-level detail. When describing high-level technology, such as a programming model, such a level of abstraction is appropriate. Microarchitectural detail describes high level detail concerning an implementation of an architecture (even as the same microarchitecture may be able to execute different ISAs). Yet, microarchitectural detail typically describes different functional units and their interrelationship, such as how and when data moves among these different functional units. As such, referencing these units by their functionality is also an appropriate level of abstraction, rather than addressing implementations of these functional units, since each of these functional units may themselves comprise hundreds of thousands or millions of gates. When addressing some particular feature of these functional units, it may be appropriate to identify substituent functions of these units, and abstract those, while addressing in more detail the relevant part of that functional unit.

Eventually, a precise logical arrangement of the gates and interconnect (a netlist) implementing these functional units (in the context of the entire processor) can be specified. However, how such logical arrangement is physically realized in a particular chip (how that logic and interconnect is laid out in a particular design) still may differ in different process technology and for a variety of other reasons. Many of the details concerning producing netlists for functional units as well as actual layout are determined using design automation, proceeding from a high level logical description of the logic to be implemented (e.g., a "hardware description language").

The term "circuitry" does not imply a single electrically connected set of circuits. Circuitry may be fixed function, configurable, or programmable. In general, circuitry implementing a functional unit is more likely to be configurable, or may be more configurable, than circuitry implementing a specific portion of a functional unit. For example, an Arithmetic Logic Unit (ALU) of a processor may reuse the same portion of circuitry differently when performing different arithmetic or logic operations. As such, that portion of circuitry is effectively circuitry or part of circuitry for each different operation, when configured to perform or otherwise interconnected to perform each different operation. Such configuration may come from or be based on instructions, or microcode, for example.

In all these cases, describing portions of a processor in terms of its functionality conveys structure to a person of ordinary skill in the art. In the context of this disclosure, the term "unit" refers, in some implementations, to a class or group of circuitry that implements the functions or functions attributed to that unit. Such circuitry may implement additional functions, and so identification of circuitry performing one function does not mean that the same circuitry, or a portion thereof, cannot also perform other functions. In some circumstances, the functional unit may be identified, and then functional description of circuitry that performs a certain feature differently, or implements a new feature may be described. For example, a "decode unit" refers to circuitry implementing decoding of processor instructions. The description explicates that in some aspects, such decode unit, and hence circuitry implementing such decode unit, supports decoding of specified instruction types. Decoding of instructions differs across different architectures and microarchitectures, and the term makes no exclusion thereof, except for the explicit requirements of the claims. For example, different microarchitectures may implement instruction decoding and instruction scheduling somewhat differently, in accordance with design goals of that implementation. Similarly, there are situations in which structures have taken their names from the functions that they perform. For example, a "decoder" of program instructions, that behaves in a prescribed manner, describes structure supports that behavior. In some cases, the structure may have permanent physical differences or adaptations from decoders that do not support such behavior. However, such structure also may be produced by a temporary adaptation or configuration, such as one caused under program control, microcode, or other source of configuration.

Different approaches to design of circuitry exist, for example, circuitry may be synchronous or asynchronous with respect to a clock. Circuitry may be designed to be static or be dynamic. Different circuit design philosophies may be used to implement different functional units or parts thereof. Absent some context-specific basis, "circuitry" encompasses all such design approaches.

Although circuitry or functional units described herein may be most frequently implemented by electrical circuitry, and more particularly, by circuitry that primarily relies on a transistor implemented in a semiconductor as a primary switch element, this term is to be understood in relation to the technology being disclosed. For example, different physical processes may be used in circuitry implementing aspects of the disclosure, such as optical, nanotubes, microelectrical mechanical elements, quantum switches or memory storage, magnetoresistive logic elements, and so on. Although a choice of technology used to construct circuitry or functional units according to the technology may change over time, this choice is an implementation decision to be made in accordance with the then-current state of technology. This is exemplified by the transitions from using vacuum tubes as switching elements to using circuits with discrete transistors, to using integrated circuits, and advances in memory technologies, in that while there were many inventions in each of these areas, these inventions did not necessarily fundamentally change how computers fundamentally worked. For example, the use of stored programs having a sequence of instructions selected from an instruction set architecture was an important change from a computer that required physical rewiring to change the program, but subsequently, many advances were made to various functional units within such a stored-program computer.

Functional modules may be composed of circuitry, where such circuitry may be fixed function, configurable under program control or under other configuration information, or some combination thereof. Functional modules themselves thus may be described by the functions that they perform, to helpfully abstract how some of the constituent portions of such functions may be implemented.

In some situations, circuitry and functional modules may be described partially in functional terms, and partially in structural terms. In some situations, the structural portion of such a description may be described in terms of a configuration applied to circuitry or to functional modules, or both.

Although some subject matter may have been described in language specific to examples of structural features and/or method steps, it is to be understood that the subject matter defined in the appended claims is not necessarily limited to these described features or acts. For example, a given structural feature may be subsumed within another structural element, or such feature may be split among or distributed to distinct components. Similarly, an example portion of a process may be achieved as a by-product or concurrently with performance of another act or process, or may be performed as multiple separate acts in some implementations. As such, implementations according to this disclosure are not limited to those that have a 1:1 correspondence to the examples depicted and/or described.

Above, various examples of computing hardware and/or software programming were explained, as well as examples how such hardware/software can intercommunicate. These examples of hardware or hardware configured with software and such communications interfaces provide means for accomplishing the functions attributed to each of them. For example, a means for performing implementations of software processes described herein includes machine executable code used to configure a machine to perform such process. Some aspects of the disclosure pertain to processes carried out by limited configurability or fixed function circuits and in such situations, means for performing such processes include one or more of special purpose and limited-programmability hardware. Such hardware can be controlled or invoked by software executing on a general purpose computer.

Implementations of the disclosure may be provided for use in embedded systems, such as televisions, appliances, vehicles, or personal computers, desktop computers, laptop computers, message processors, hand-held devices, multi-processor systems, microprocessor-based or programmable consumer electronics, game consoles, network PCs, mini-computers, mainframe computers, mobile telephones, PDAs, tablets and the like.

In addition to hardware embodiments (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Embodiments can be disposed in computer usable medium including non-transitory memories such as memories using semiconductor, magnetic disk, optical disk, ferrous, resistive memory, and so on.

As specific examples, it is understood that implementations of disclosed apparatuses and methods may be implemented in a semiconductor intellectual property core, such as a microprocessor core, or a portion thereof, embodied in a Hardware Description Language (HDL)), that can be used to produce a specific integrated circuit implementation. A computer readable medium may embody or store such description language data, and thus constitute an article of manufacture. A non-transitory machine readable medium is an example of computer readable media. Examples of other embodiments include computer readable media storing Register Transfer Language (RTL) description that may be adapted for use in a specific architecture or microarchitecture implementation. Additionally, the apparatus and methods described herein may be embodied as a combination of hardware and software that configures or programs hardware.

Also, in some cases, terminology has been used herein because it is considered to more reasonably convey salient points to a person of ordinary skill, but such terminology should not be considered to impliedly limit a range of implementations encompassed by disclosed examples and other aspects. A number of examples have been illustrated and described in the preceding disclosure. By necessity, not every example can illustrate every aspect, and the examples do not illustrate exclusive compositions of such aspects. Instead, aspects illustrated and described with respect to one figure or example can be used or combined with aspects illustrated and described with respect to other figures. As such, a person of ordinary skill would understand from these disclosures that the above disclosure is not limiting as to constituency of embodiments according to the claims, and rather the scope of the claims define the breadth and scope of inventive embodiments herein. The summary and abstract sections may set forth one or more but not all exemplary embodiments and aspects of the invention within the scope of the claims.

We claim:

1. A method implemented in a processor, comprising:
receiving, in an address calculation unit, an instruction providing a first operand which comprises a first value expressed by a number of bits equal to a width of general-purpose registers in the processor, and a second operand comprising an immediate value of a predefined number of bits;
making a comparison between predetermined address ranges and portions of the first and second operands to determine whether the first and second operands are within any of a set of predetermined numerical ranges; and
depending on a result of the comparison:
if the result is positive, responsively performing an arithmetic operation on a least significant portion of the first operand and a sign-extended second operand, the least significant portion having a predetermined number of bits, to produce an effective address for executing the instruction, and
if the result is negative, responsively performing an arithmetic operation on the whole of the first operand and a sign-extended second operand to produce an effective address for executing the instruction.

2. The method implemented in a processor of claim 1, further comprising accessing the first operand from a register that is identified during decoding of an instruction.

3. The method implemented in a processor of claim 2, further comprising decoding the immediate value from the instruction, and the performing of the arithmetic operation comprises adding the immediate value to either the least significant portion of the first operand or the whole of the first operand.

4. The method implemented in a processor of claim 1, wherein the general-purpose registers have a width of 64 bits, and the predetermined number of bits in the least significant portion of the first operand is 32 bits.

5. The method implemented in a processor of claim 1, further comprising decoding the instruction to determine that the instruction is one of a load of a second value from memory and a store to memory, and to determine a register identified by the instruction, and the receiving comprises receiving, at an address generation unit of a Load/Store Unit (LSU) of the processor, the second value from the register identified by the instruction.

6. The method implemented in a processor of claim 1, wherein the set of predetermined numerical ranges are defined by most-significant bits either being all binary 1 or all binary 0, wherein the most-significant bits are the bits from a general-purpose register not included within the least significant portion.

7. The method implemented in a processor of claim 6, wherein the general-purpose registers have 64 bits, and the least significant portion is 32 bits.

8. The method implemented in a processor of claim 1, wherein the address calculation unit is provided in an instruction fetch unit and the effective address is used as a location from which to fetch one or more instructions to be executed by the processor.

9. The method implemented in a processor of claim 1, wherein if the first operand is not within any range of the predetermined set of ranges, then determining to treat the first operand as double-word sized, performing an arithmetic operation using the double-word sized operand and not sign-extending the second operand.

10. The method implemented in a processor of claim 1, further comprising using the effective address as a memory address from which to retrieve one or more bytes of data.

11. The method implemented in a processor of claim 1, further comprising using the effective address as a memory address at which to store one or more bytes of data.

12. The method implemented in a processor of claim 1, further comprising using the effective address as a memory address locating one or more instructions to be fetched.

13. A processor for executing machine executable code having different memory addressability ranges, comprising:
a plurality of general-purpose registers, each being of a register size; and
an address calculation unit for receiving an instruction providing a first operand which comprises a first value expressed by a number of bits equal to a width of the plurality of registers, and a second operand comprising an immediate value of a predefined number of bits;
wherein the address calculation unit is further configured to:
make a comparison between predetermined address ranges and portions of the first and second operands to determine whether the first and second operands are within any of a set of predetermined numerical ranges; and
depending on a result of the comparison:
if the result is positive, perform an arithmetic operation on a least significant portion of the first operand and a sign-extended second operand, the least significant portion having a predetermined number of bits, to produce an effective address for executing the instruction, and
if the result is negative, perform an arithmetic operation on the whole of the first operand and a sign-extended second operand to produce an effective address for executing the instruction.

14. The processor for executing machine executable code having different memory addressability ranges of claim 13, wherein the address calculation unit is configured to calculate the effective address by adding the immediate value to either the least significant portion of the first operand or the whole of the first operand, if the contents of the register are within any range of the predetermined set of ranges.

15. The processor for executing machine executable code having different memory addressability ranges of claim 14, wherein the general-purpose registers have a width of 64 bits, and the predetermined number of bits in the least significant portion of the first operand is 32 bits.

16. The processor for executing machine executable code having different memory addressability ranges of claim 13, wherein the address calculation unit is located in a load store unit.

17. The processor for executing machine executable code having different memory addressability ranges of claim 13, wherein the address calculation unit is located in a fetch unit.

18. The processor for executing machine executable code having different memory addressability ranges of claim 13, wherein the set of predetermined numerical ranges are defined by most-significant bits either being all binary 1 or all binary 0, wherein the most-significant bits are the bits from a general-purpose register not included within the least significant portion.

19. The processor for executing machine executable code having different memory addressability ranges of claim 13, wherein the registers have 64 bits, and a least significant portion of each register is 32 bits.

20. The processor for executing machine executable code having different memory addressability ranges of claim 13, wherein the address calculation unit is configured, if the first operand is not within any range of the predetermined set of ranges, to treat the operand as double-word sized, perform an arithmetic operation using the double-word sized operand and not sign-extending a result of the arithmetic operation.

21. The processor for executing machine executable code having different memory addressability ranges of claim 13, further comprising using the effective address as a memory address from which to retrieve or at which to store one or more bytes of data.

22. The processor for executing machine readable code having different memory addressability ranges of claim 13 further comprising an instruction decoding unit configured to decode arithmetic instructions that each identify one or more source registers, and specify whether the instruction is to be executed using the entirety of each source register or portion thereof, and to decode memory access instructions that specify a register, but to not specify whether to use the entirety of that register or portion thereof.

23. The method implemented in a processor of claim 1 wherein the method is performed modelessly.

* * * * *